(12) United States Patent
Luo et al.

(10) Patent No.: US 9,396,265 B2
(45) Date of Patent: Jul. 19, 2016

(54) METHOD AND APPARATUS FOR AQUIRING DYNAMIC MESSAGE

(71) Applicant: TENCENT TECHNOLOGY (SHENZHEN) COMPANY LIMITED, Shenzhen (CN)

(72) Inventors: Maozheng Luo, Shenzhen (CN); Hao Zhang, Shenzhen (CN); Shuyang Lin, Shenzhen (CN); Rongjin Zheng, Shenzhen (CN); Yong Yang, Shenzhen (CN); Zhihao Wang, Shenzhen (CN); Yanqiang Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/423,586

(22) PCT Filed: Aug. 21, 2013

(86) PCT No.: PCT/CN2013/081933
§ 371 (c)(1),
(2) Date: Feb. 24, 2015

(87) PCT Pub. No.: WO2014/029332
PCT Pub. Date: Feb. 27, 2014

(65) Prior Publication Data
US 2015/0324463 A1 Nov. 12, 2015

(30) Foreign Application Priority Data
Aug. 24, 2012 (CN) .......................... 2012 1 0303950

(51) Int. Cl.
*G06F 17/30* (2006.01)
*H04W 4/12* (2009.01)
(Continued)

(52) U.S. Cl.
CPC .......... *G06F 17/30864* (2013.01); *H04L 51/32* (2013.01); *H04W 4/12* (2013.01); *H04W 4/206* (2013.01)

(58) Field of Classification Search
None
See application file for complete search history.

(56) References Cited

U.S. PATENT DOCUMENTS

| 2010/0235886 | A1 | 9/2010 | Muller et al. | |
|---|---|---|---|---|
| 2012/0108225 | A1 | 5/2012 | Luna et al. | |
| 2013/0054706 | A1* | 2/2013 | Graham | H04M 19/04 709/206 |
| 2013/0132393 | A1* | 5/2013 | Chen | G06F 17/30598 707/737 |

FOREIGN PATENT DOCUMENTS

| CN | 101894128 A | 11/2010 |
|---|---|---|
| CN | 101980497 A | 2/2011 |

(Continued)

OTHER PUBLICATIONS

International Search Report issued Nov. 21, 2013 re: PCT/CN2013/081933; citing: CN 102447647 A, CN 101894128 A, CN 101980497 A and US 2010235886 A1.

(Continued)

*Primary Examiner* — Albert Phillips, III
(74) *Attorney, Agent, or Firm* — Cantor Colburn LLP (57) ABSTRACT

The present invention discloses a method and apparatus for obtaining dynamic information. In the method, a first client of a first user obtains a relationship chain of the first user, wherein the relationship chain of the first user comprises at least one second user; determines an active degree of the at least one second user in a preset first time period, determines a time interval reference value of requesting dynamic information according to the active degree, determines an information updating degree of the at least one second user in a preset second time interval, determining a time interval adjustment value of requesting the dynamic information based on the information updating degree; determines a time interval value according to the time interval reference value and the time interval adjustment value of requesting the dynamic information, and requests the dynamic information of the at least one second user according to the time interval value of requesting the dynamic information. Thus, a balance between a real-time performance and an amount of service requests is performed, costs are saved and it is ensured to obtain the dynamic information in real time.

4 Claims, 3 Drawing Sheets

(51) Int. Cl.
*H04W 4/20* (2009.01)
*H04L 12/58* (2006.01)

(56) References Cited

FOREIGN PATENT DOCUMENTS

| | | | |
|---|---|---|---|
| CN | 102447647 A | 5/2012 | |
| JP | 2008046770 A | 2/2008 | |
| JP | 2008204153 A | 9/2008 | |
| WO | WO 2011134314 A1 * | 11/2011 | ............. G06Q 10/10 |

OTHER PUBLICATIONS

Written Opinion issued Nov. 21, 2013 re: Application No. PCT/CN2013/081933; citing: CN 102447647.
European Search Report issued Jul. 3, 2015 re: Application No. PCT/CN2013/081933; pp: 1-5; citing: US 2012/108225 A1, JP 2008 204153 A and CN 102 447 647 A.
Japanese Office Action issued Jul. 9, 2015 re: Application No. 2015-52777; pp. 1-6.

* cited by examiner

METHOD AND APPARATUS FOR AQUIRING DYNAMIC MESSAGE

FIELD OF THE INVENTION

The present invention relates to an internet application technology field, and more particularly, to a method and apparatus for obtaining dynamic information.

BACKGROUND OF THE INVENTION

With the development of a computer technology and a network technology, an internet plays a more and more important role in people daily living, learning and working. Moreover, with the development of the internet, the internet is developed to directions such as a mobile direction, a social direction.

A social network, e.g., a Social Network Service (SNS) plays an important role in people living, and becomes a part of the people living. The social network has an important impact for obtaining information, thinking and living for people. Moreover, the social network becomes windows that people obtain information, show themselves and perform marketing.

In the social network, users understand latest dynamic information about each other through various social applications (e.g., a microblog, a blog, a personal space). In each social application, friends usually have the updated dynamic information, e.g., releasing a space log, transmitting a picture, releasing a new microblog, raising a sharing problem, releasing a schedule, uploading an music file, which are called that the friends have new dynamic information. In order to understand the dynamic information of the friends in time and make interaction with the friends better, it is required to obtain the dynamic information of the friends.

At present, a method that browsers obtain data from servers in a timing manner is adopted in order to show dynamic information of friends to users. In particular, when the users are in a scenario to show the dynamic message of the friends in real time, the browsers running on user equipments can requests to servers every a fixed time interval (e.g., one minute) to enquire whether there is new dynamic data of the friends that can be shown to the users.

However, there are at least shortcomings in the technical solution.

(1) The time interval for updating the dynamic information is same for all the users. It is difficult to perform personal handling for the time interval for different scenarios and different users. For example, for users friends of which actively update the dynamic information, when the time interval for updating the dynamic information is long, the users cannot obtain updated dynamic information of the friends in time. Thus, user experience will be bad.

(2) It is difficult to configure a reasonable updating time interval value for all users. When the updating time interval is short, requests to servers are frequent. For users friends of which do not actively update the dynamic information, the servers may return data not updated. Thus, there are large amount of empty requests, and processing load of the servers will be increased. When the updating time interval is long, the users friends of which actively update the dynamic information cannot obtain the updated dynamic information of the friends in time. Thus, user experience will be bad.

SUMMARY OF THE INVENTION

A method for obtaining dynamic information is provided according to an embodiment of the present invention, so that in the condition that updated dynamic information of the at least one second user is obtained in real time, the number of dynamic message requests is reasonably decreased, and processing load of the servers is decreased.

An apparatus for obtaining dynamic information is also provided according to an embodiment of the present invention, so that in the condition that updated dynamic information of the at least one second user is obtained in real time, the number of dynamic message requests is reasonably decreased, and processing load of the servers is decreased.

A method for obtaining dynamic information includes:

obtaining, by a first client of a first user, a relationship chain of the first user, wherein the relationship chain of the first user comprises at least one second user;

determining, by the first client, an active degree of the at least one second user in a preset first time period, determining a time interval reference value of requesting dynamic information according to the active degree, determining an information updating degree of the at least one second user in a preset second time interval, determining a time interval adjustment value of requesting the dynamic information based on the information updating degree;

determining, by the first client, a time interval value according to the time interval reference value and the time interval adjustment value of requesting the dynamic information, and requesting the dynamic information of the at least one second user according to the time interval value of requesting the dynamic information.

An apparatus for obtaining dynamic information, located at a first client of a first user includes:

a user relationship chain obtaining module, to obtain a relationship chain of the first user, wherein the relationship chain of the first user comprises at least one second user;

an active degree and information updating degree calculating module, to determine an active degree of the at least one second user in a preset first time period, determine a time interval reference value of requesting dynamic information according to the active degree, determine an information updating degree of the at least one second user in a preset second time interval, determine a time interval adjustment value of requesting the dynamic information based on the information updating degree; and a dynamic information requesting module, to determine a time interval value according to the time interval reference value and the time interval adjustment value of requesting the dynamic information, and request the dynamic information of the at least one second user according to the time interval value of requesting the dynamic information.

It can be seen from the above that a first client of a first user obtains a relationship chain of the first user, wherein the relationship chain of the first user comprises at least one second user; determines an active degree of the at least one second user in a preset first time period, determines a time interval reference value of requesting dynamic information according to the active degree, determines an information updating degree of the at least one second user in a preset second time interval and determines a time interval adjustment value of requesting the dynamic information based on the information updating degree; determines a time interval value according to the time interval reference value and the time interval adjustment value of requesting the dynamic information, and requests the dynamic information of the at least one second user according to the time interval value of requesting the dynamic information. Thus, according to embodiments of the present invention, all users are not configured with a same time interval value. According to a previous active degree of the at least one second user and an active degree of the at least one second user in a previous short time period, time interval values for different users are respectively calculated. Thus, according to active degrees of the at least one second users, a time interval value of requesting the dynamic information is accurately controlled.

Furthermore, according to embodiments of the present invention, a friend dynamic information request will not be continuously transmitted to a server. Thus, a balance between a real-time performance and an amount of service requests is performed, costs are saved and it is ensured to obtain the dynamic information in real time.

DETAILED DESCRIPTION OF THE INVENTION

In order to make the object, technical solution and merits of the present invention clearer, the present invention will be illustrated in detail hereinafter with reference to the accompanying drawings and specific examples.

According to an embodiment of the present invention, for a characteristic of a social application, a method that a time internal of requesting dynamic information is determined according to a updating condition of each first user and at least one second user in a relationship list of the first user, so as to ensure that the number of dynamic message requests transmitted by the first user is reasonably decreased in the condition that updated dynamic information of the at least one second user is obtained in real time.

Figure 1:
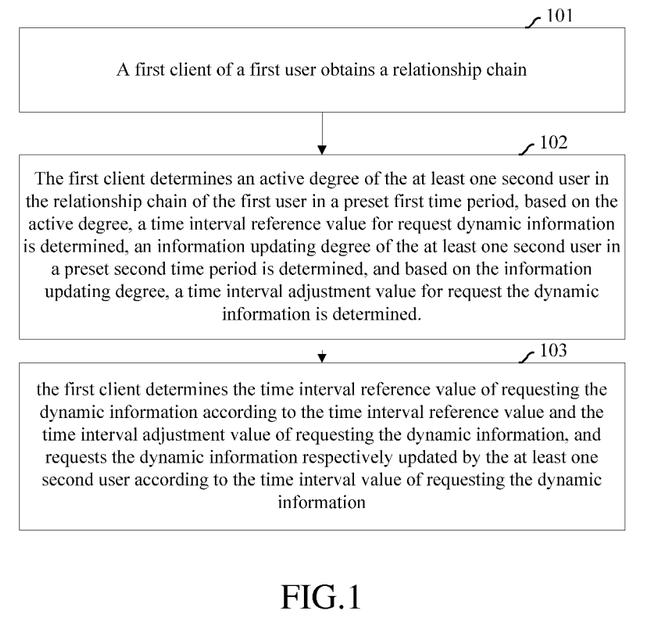
FIG. 1 is a schematic diagram illustrating a method for obtaining dynamic information according to an embodiment of the present invention.

FIG. 1 is a schematic diagram illustrating a method for obtaining dynamic information according to an embodiment of the present invention. The method may be implemented by a first client of a first user. The first client may be a computing device such as a personal computer, a smart terminal etc.

As shown in FIG. 1, the method includes procedures as follows.

At block 101, a first client of a first user obtains a relationship chain.

The relationship chain of the first user includes at least one second user. Each of the at least one second user may be a friend of the first user. The relationship chain may include a user identifier (e.g., a QQ account of a user). Each social application may obtain information through a relationship chain of a user. The relationship chain of the user may be stored in a server on remote, or may be stored in a terminal on local. The relationship chain for each user may be changed from time to time. In an example, the relationship chain of the user is obtained from a memory storing the relationship chain.

At block 102, the first client determines an active degree of the at least one second user in the relationship chain of the first user in a preset first time period, based on the active degree, a time interval reference value for request dynamic information is determined, an information updating degree of the at least one second user in a preset second time period is determined, and based on the information updating degree, a time interval adjustment value for request the dynamic information is determined.

There are two values to be determined, the time interval reference value and the time interval adjustment value of requesting the dynamic information. The time interval reference value of requesting the dynamic information is configured to determine a reference value of a time period of transmitting a dynamic message request. The time interval adjustment value is configured to adjust the time interval reference value of requesting the dynamic information.

In an example, a process of determining the time interval reference value of requesting the dynamic information may include procedures as follows.

It is determined whether there is the updated dynamic information for the at least one second user in the preset first time period. The dynamic information may include at least one of a space log, a picture, a microblog released by a user, a sharing problem raised by the user, a schedule released by the user, an uploaded music file. A friend of a user may update the information, e.g., releasing new dynamic information or modifying the dynamic information previously released. If there is the updated dynamic information for the at least one second user in the preset first time period, the number of second users respectively updating the dynamic information is recorded. The active degree of the at least one second users in the first preset time period is calculated according to the recorded number of the second users respectively updating the dynamic information and a length of the preset first time period. The active degree is a parameter to determine the time interval reference value. The parameter is related with the number of second users respectively updating the dynamic information. The more the number of the second users respectively updating the dynamic information in the relationship chain of the user is more, the larger the active degree.

The preset first time period is configured to quantify a previous active degree of the at least one second user. In an example, the preset first time period may be configured as a continuous time period from a previous moment to a current moment. In an example, the length of the preset first time period may be determined in a timestamp manner. In particular, a time stamp may include the number of seconds from Jan. 1, 1970 (00:00:00 GMT) to a time point needed to be indicated. A meaning or expression of the time stamp may be accordingly changed for different application scenarios and system requirements, which is not limited in the embodiment of the present invention. Those skilled in the art can understand that there are some ways to select the preset first time period, which is not limited in the present invention.

Based on different scenarios and applications, different time lengths may be respectively configured as a length of the preset first time period, e.g., 30 minutes, 60 minutes, 2 hours etc.

In an example, the active degree M of the at least one second user in the preset first time period may be calculated through a way as follows:

$$M=(m \times na)/ti;$$

wherein m is a preset reference coefficient of the active degree, and is adjustable; ti is a length of the preset first time period, and is dynamically adjustable; na is the number of second users respectively updating the dynamic information in the preset first time period.

For example, it is assumed that there are 100 second users in a relationship of a first user, the preset first time period is 10 minutes (e.g., 600 s) before the current time point, the reference coefficient of the active degree is configured as 200, the number of second users respectively updating the dynamic information in the relationship chain of the first user in the preset first time period is configured as 20.

The active degree M is equal to (200×20)/1800=2.2.

The determined time interval reference value of requesting the dynamic information is inversely proportion to the active degree. In an example, the process of determining the time interval reference value of requesting the dynamic information based on the active degree includes:

determining the time interval reference value of requesting the dynamic information A.

In an example, A=T−M, wherein T is a preset time value.

It is assumed T is preset as 100 seconds, the determined time interval reference value A of requesting the dynamic information is equal to 100−2.2=97.8.

Calculation formulas of determining the time interval reference value of requesting the dynamic information is illustrated above. Those skilled in the art can understand that the formulas above are merely exemplary, which cannot limit the protection scope of the present invention.

A process of determining the time interval adjustment value of the dynamic information request is illustrated as follows.

In an example, it is determined whether there is updated dynamic information for the at least one second user in the relationship chain of the first user in the preset second time period. If there is the updated dynamic information for the at least one second user in the preset second time period, the number of pieces of the dynamic information updated by all the at least one second user in the relationship chain of the first user in the preset second time period is obtained. According to the number of the pieces of the updated dynamic information and a length of the preset second time period, the information updating degree of the at least one second user in the preset second user is calculated. The information updating degree is configured to determine the time interval adjustment value of requesting the dynamic information. The information updating degree is related with the number of the pieces of the dynamic information updated by all the at least one second users in a preset time period (e.g., the second preset time period).

The second preset time period is configured to quantify active degree in a previous short time period. In an example, the preset second time period may be configured as a time period from a time point when a dynamic information request is transmitted last time to a time point when the dynamic information request is transmitted this time. In an example, the length of the preset second time period may be determined in a timestamp manner. In another example, the preset second time period may be configured as a time period from a time point when the latest dynamic information request is transmitted to a time point when the dynamic information request just before the latest dynamic information request is transmitted. Those skilled in the art can understand that there are some ways to select the preset second time period, which is not limited in the present invention.

The determined time interval adjustment value of requesting the dynamic information is proportional relationship to the information updating degree. In particular, the process of determining the information updating degree of friends in the preset second time period according to the number of the pieces of the updated dynamic information and the length of the second preset time period includes:

calculating the information updating degree N in the preset second time period, wherein N=(n×ta)/nb, n is a preset reference coefficient of the information updating degree, and is adjustable; to is a length of the preset second time period, and is adjustable; nb is the number of the pieces of the dynamic information respectively updated by all the at least one second user in a friend relationship chain.

For example, it is assumed that n is equal to 5, a time interval from the time point when the dynamic information is transmitted last time to the time point when the dynamic information is transmitted this time is equal to 10 s, i.e., the length of the preset second time period is equal to 10 s, the number of the pieces of the updated dynamic information obtained through the dynamic information request is equal to 10.

The information updating degree in the preset second time period is equal to (n×ta)/nb=(5×10)/10=5

Moreover, the time interval adjustment value of requesting the dynamic information B is determined based on the information updating degree through a way as follows:

$$B = T \times N,$$

wherein T is a preset reference coefficient of the adjustment value, and is adjustable.

It is assumed the preset reference coefficient T of the adjustment value is equal to 2.

B is equal to T×N=5×2=10 s.

So far, the time interval reference value and the time interval adjustment value of requesting the dynamic information are respectively determined, wherein the time interval reference value of requesting the dynamic information is related with the previous active degree of the at least one second user in the relationship chain of the first user, the time interval adjustment value of requesting the dynamic information is related with the active degree of the at least one second user in the relationship chain of the first user in a previous short time period.

At block 103, the first client determines the time interval reference value of requesting the dynamic information according to the time interval reference value and the time interval adjustment value of requesting the dynamic information, and requests the dynamic information respectively updated by the at least one second user according to the time interval value of requesting the dynamic information.

After determining the time interval reference value and the time interval adjustment value of requesting the dynamic information, the time interval value of requesting the dynamic information is determined, and eventually, according to the time interval value of requesting the dynamic information, the dynamic information respectively updated by the at least one second user is requested.

The process of determining the time interval value of requesting the dynamic information according to the time interval reference value and the time interval adjustment value of requesting the dynamic information is based on the following rules.

(A) The time interval reference value of requesting the dynamic information is a dominant factor, and reflects a trend of a size of the time interval value of requesting the dynamic information, i.e., the larger the time interval reference value of requesting the dynamic information, the larger the time interval value of requesting the dynamic information.

(B) The time interval value of requesting the dynamic information is amended according to the time interval adjustment value of requesting the dynamic information, i.e., the larger the time interval adjustment value of requesting the dynamic information, the smaller the time interval value of requesting the dynamic information.

In an example, the time interval value X of requesting the dynamic information may be determined through a method as follows:

$$X=A-B.$$

The time interval value X of requesting the dynamic information is equal to A−B=97.8−10=87.8 s.

The time interval is 87.8 s, the time interval is from the time point when the dynamic information is requested this time to the time point when the dynamic information is requested next time.

According to a timing mechanism, the determined time interval value of requesting the dynamic information may be configured as a timing time. When the timing time arrives, a computing device on which the client of the first user runs (e.g., a client or a browser in the computing device on which the client runs) requests a server the updated dynamic information in the relationship chain of the first user. According to the procedures above, the time interval value of requesting the dynamic information of the at least one second users is determined, and the computing device requests the server the updated dynamic information again.

According to the embodiment of the present invention, a detail method for determining a time interval value X of requesting the dynamic information is illustrated. Those skilled in the art can understand that the embodiment above are merely exemplary, which cannot limit the protection scope of the present invention.

Based on analysis above, the method according to the embodiment of the present invention can be applied to some social applications, e.g., the method according to the embodiment of the present invention can be applied to information management in a social space.

In an example, it is assumed there is a social application that a first user may pay attention to dynamic information of at least one second user in a relationship chain of the first user in a condition not impacting an operation in a subject webpage. In order to ensure real-time experience of the first user, a browser or a client needs to continuously transmit a request to a server to obtain user data of the at least one second user. With increase of the number of users, the server will have to process a large amount of querying requests. Thus, performance of the server will be improved to support the server. Thus, system operating costs will be increased.

Figure 2:
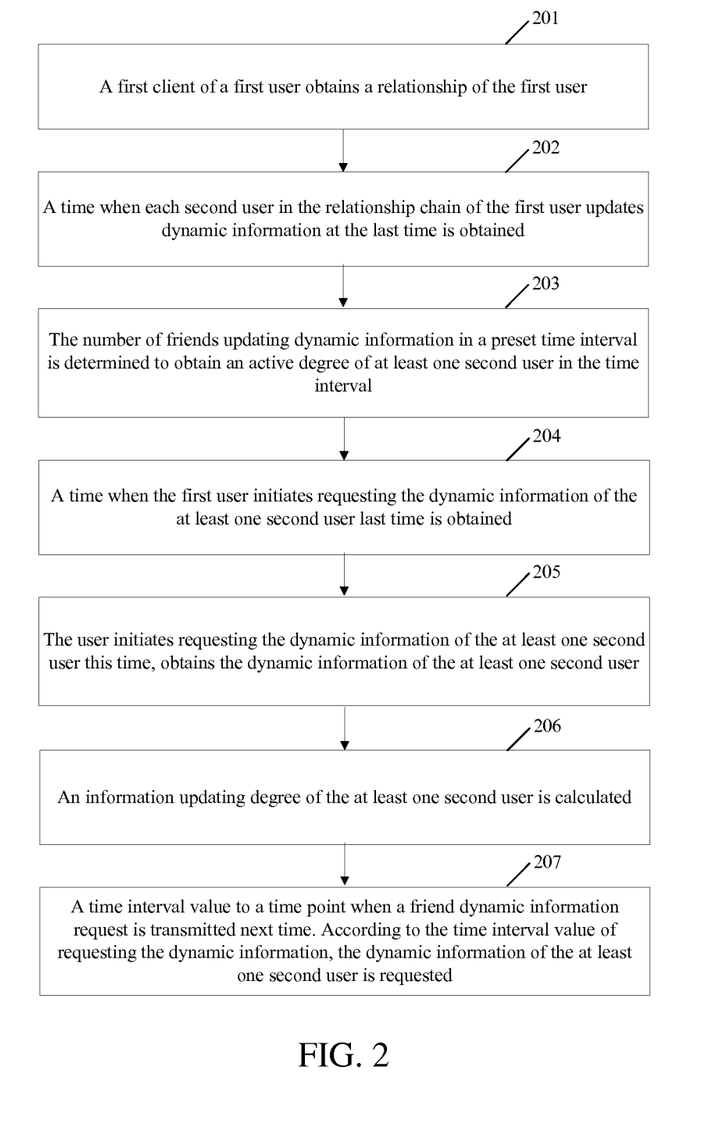
FIG. 2 is a schematic diagram illustrating a method for obtaining dynamic information according to an embodiment of the present invention.

In an example, according to an embodiment of the present invention, a method is provided to solve the problem. FIG. 2 is a schematic diagram illustrating a method for obtaining dynamic information according to an embodiment of the present invention.

As shown in FIG. 2, the method includes procedures as follows.

At block 201, a first client of a first user obtains a relationship of the first user.

At block 202, a time when each second user in the relationship chain of the first user updates dynamic information at the last time is obtained.

At block 203, based on the obtained time when each second user in the relationship chain of the first user updates the dynamic information at the last time, the number of friends updating dynamic information in a preset time interval (in an example, from a current time point to a time point before the current time point) is determined to obtain an active degree of at least one second user in the time interval. According to the active degree, a time interval reference value of requesting the dynamic information is determined.

At block 204, a time when the first user initiates requesting the dynamic information of the at least one second user last time is obtained to determine a time interval at block 206.

At block 205, the user initiates requesting the dynamic information of the at least one second user this time, obtains the dynamic information of the at least one second user.

At block 206, a time interval is determined from a time point when the user requests the dynamic information of the at least one second user last time to a time point when the user requests the dynamic information of the at least one second user this time, an information updating degree of the at least one second user is calculated according to the obtained time interval and the number of pieces of dynamic information that have been respectively updated by the at least one second user. According to the information updating degree, a time interval adjustment value of requesting the dynamic information is determined.

At block 207, According to the determined time interval reference value and the time interval adjustment value of requesting the dynamic information, a time interval value to a time point when a friend dynamic information request is transmitted next time. According to the time interval value of requesting the dynamic information, the dynamic information of the at least one second user is requested.

According to analysis above, an apparatus for obtaining dynamic information is provided according to an example of the present invention.

Figure 3:
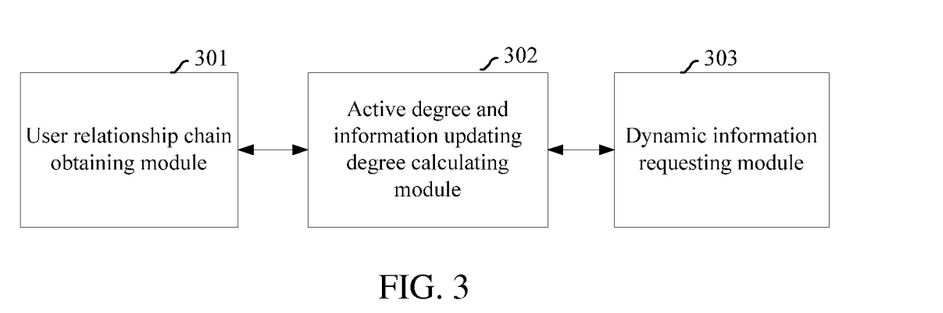
FIG. 3 is a schematic diagram illustrating a structure of an apparatus for obtaining dynamic information according to an embodiment of the present invention.

FIG. 3 is a schematic diagram illustrating a structure of an apparatus for obtaining dynamic information according to an embodiment of the present invention. As shown in FIG. 3, the apparatus includes a user relationship chain obtaining module 301, an active degree and information updating degree calculating module 302 and a dynamic information requesting module 303.

The user relationship chain obtaining module 301 is to obtain a relationship chain of the first user, wherein the relationship chain of the first user includes at least one second user.

The active degree and information updating degree calculating module 302 is to determine an active degree of the at least one second user in a preset first time period, determine a time interval reference value of requesting dynamic information according to the active degree, determine an information updating degree of the at least one second user in a preset second time interval, determine a time interval adjustment value of requesting the dynamic information based on the information updating degree, wherein the relationship chain of the first user includes at least one second user.

The dynamic information requesting module 303 is to determine a time interval value according to the time interval reference value and the time interval adjustment value of requesting the dynamic information, and request the dynamic information of the at least one second user according to the time interval value of requesting the dynamic information.

In an example, the active degree and information updating degree calculating module 302 is to determine whether there is the updated dynamic information for the at least one second user in the preset first time period; when there is the updated dynamic information for the at least one second user in the preset first time period, record the number of second users respectively updating the dynamic information, and calculate the active degree of the at least one second user in the preset first time period according to the recorded number of the second users respectively updating the dynamic information and a length of the preset first time period.

In an example, the active degree and information updating degree calculating module 302 is to calculate the active degree M of the at least one second user in the preset first time period through a way as follows:

$$M=(m\times na)/ti;$$

wherein m includes a preset reference coefficient of the active degree, ti includes a length of the preset first time period, na includes the number of the second users respectively updating the dynamic information in the preset first time period.

In an example, the active degree and information updating degree calculating module 302 is to determine the time interval reference value A of requesting the dynamic information based on the active degree through a way as follows:

$$A=T-M,$$

wherein T includes a preset time value, M includes the active degree of the at least one second users in the preset first time period.

In an example, the active degree and information updating degree calculating module 302 is to determine whether there is the updated dynamic information for the at least one second user in the preset second time period; when there is the updated dynamic information for the at least one second user in the preset second time period, obtain the number of pieces of the updated dynamic information for all the at least one second user in the preset time period, calculate the information updating degree in the preset second time period according to the number of the pieces of the updated dynamic information and a length of the preset second time period, wherein time interval adjustment value of requesting the dynamic information is proportional relationship to the information updating degree.

In an example, the active degree and information updating degree calculating module 302 is to calculate the information updating degree N of the at least one second user in the preset second time period through a way as follows:

$$N=(n\times ta)/nb,$$

wherein n includes a preset reference coefficient of the information updating degree, to includes the length of the preset second time period, nb includes the number of the pieces of the dynamic information respectively updated by all the at least one second user in the preset second time period.

In an example, the active degree and information updating degree calculating module 302 is to determine the time interval adjustment value B of requesting the dynamic information through a way as follows:

$$B=T\times N,$$

wherein T includes a preset reference coefficient of the time interval adjustment value, N includes the information updating degree of the at least one second user in the preset second time period.

In an example, the active degree and information updating degree calculating module 302 is to determine whether there is the updated dynamic information for the at least one second user in the preset first time period; when there is the updated dynamic information for the at least one second user in the preset first time period, record the number of second users respectively updating the dynamic information, and calculate the active degree M of the at least one second user in the preset first time period, wherein M=(m×na)/ti, wherein m includes a preset reference coefficient of the active degree, ti includes a length of the preset first time period, na includes the number of the second users respectively updating the dynamic information in the preset first time period, calculate the time interval reference value A of requesting the dynamic information, wherein A=T−M, wherein T includes a preset time value, determine whether there is the updated dynamic information for the at least one second user in the preset second time period; when there is the updated dynamic information for the at least one second user in the preset second time period, obtain the number of second users updating the dynamic information, calculate the information updating degree N in the preset second time period, wherein N=(n×ta)/nb, wherein n includes a preset reference coefficient of the information updating degree, to includes the length of the preset second time period, nb includes the number of the pieces of the dynamic information respectively updated by all the at least one second user in the preset second time period, calculate the time interval adjustment value B of requesting the dynamic information, wherein B=T×N, wherein T includes a preset reference coefficient of the time interval adjustment value.

The dynamic information requesting module 303 is to determine a time interval value X of requesting the dynamic information wherein X=A−B.

Figure 4:
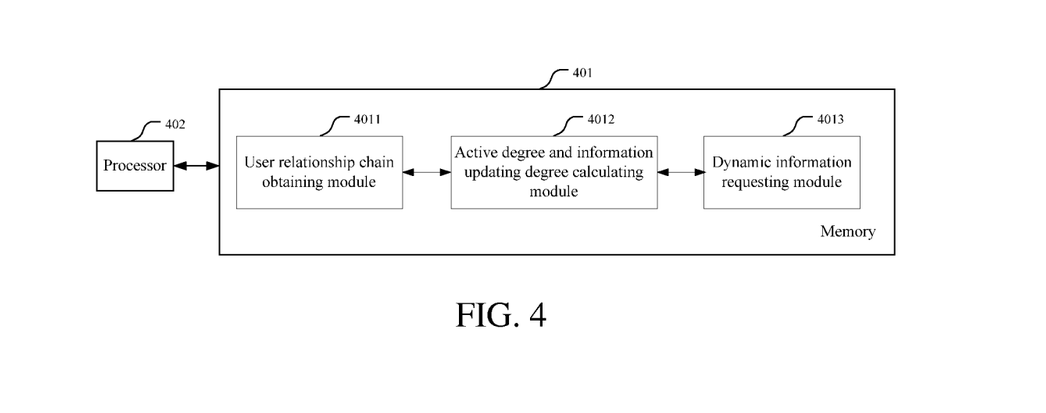
FIG. 4 is another schematic diagram illustrating a structure of an apparatus for obtaining dynamic information according to an embodiment of the present invention.

FIG. 4 is another schematic diagram illustrating a structure of an apparatus for obtaining dynamic information according to an embodiment of the present invention. As shown in FIG. 4, the apparatus includes a memory 401 and a processor 402 communicated with the memory, wherein the memory 402 includes instructions executed by the processor 402, which includes a user relationship chain obtaining instruction 4011, an active degree and information updating degree calculating instruction 4012 and a dynamic information requesting instruction 4013.

The user relationship chain obtaining instruction 4011 is to obtain a relationship chain of the first user, wherein the relationship chain of the first user includes at least one second user.

The active degree and information updating degree calculating instruction 4012 is to determine an active degree of the at least one second user in a preset first time period, determine a time interval reference value of requesting dynamic information according to the active degree, determine an information updating degree of the at least one second user in a preset second time interval, determine a time interval adjustment value of requesting the dynamic information based on the information updating degree, wherein the relationship chain of the first user includes at least one second user.

The dynamic information requesting instruction 4013 is to determine a time interval value according to the time interval reference value and the time interval adjustment value of requesting the dynamic information, and request the dynamic information of the at least one second user according to the time interval value of requesting the dynamic information.

In an example, the active degree and information updating degree calculating instruction 4012 is to determine whether there is the updated dynamic information for the at least one second user in the preset first time period; when there is the updated dynamic information for the at least one second user in the preset first time period, record the number of second users respectively updating the dynamic information, and calculate the active degree of the at least one second user in the preset first time period according to the recorded number of the second users respectively updating the dynamic information and a length of the preset first time period.

In an example, the active degree and information updating degree calculating instruction 4012 is to calculate the active degree M of the at least one second user in the preset first time period through a way as follows:

$$M=(m\times na)/ti;$$

wherein m includes a preset reference coefficient of the active degree, ti includes a length of the preset first time period, na includes the number of the second users respectively updating the dynamic information in the preset first time period.

In an example, the active degree and information updating degree calculating instruction 4012 is to determine the time interval reference value A of requesting the dynamic information based on the active degree through a way as follows:

$$A=T-M,$$

wherein T includes a preset time value, M includes the active degree of the at least one second users in the preset first time period.

In an example, the active degree and information updating degree calculating instruction 4012 is to determine whether there is the updated dynamic information for the at least one second user in the preset second time period; when there is the updated dynamic information for the at least one second user in the preset second time period, obtain the number of pieces of the updated dynamic information for all the at least one second user in the preset time period, calculate the information updating degree in the preset second time period according to the number of the pieces of the updated dynamic information and a length of the preset second time period, wherein time interval adjustment value of requesting the dynamic information is proportional relationship to the information updating degree.

In an example, the active degree and information updating degree calculating instruction 4012 is to calculate the information updating degree N of the at least one second user in the preset second time period through a way as follows:

$$N=(n \times ta)/nb,$$

wherein n includes a preset reference coefficient of the information updating degree, ta includes the length of the preset second time period, nb includes the number of the pieces of the dynamic information respectively updated by all the at least one second user in the preset second time period.

In an example, the active degree and information updating degree calculating instruction 4012 is to determine the time interval adjustment value B of requesting the dynamic information through a way as follows:

$$B=T \times N,$$

wherein T includes a preset reference coefficient of the time interval adjustment value, N includes the information updating degree of the at least one second user in the preset second time period.

It can be seen from the above that a first client of a first user obtains a relationship chain of the first user, wherein the relationship chain of the first user comprises at least one second user; determines an active degree of the at least one second user in a preset first time period, determines a time interval reference value of requesting dynamic information according to the active degree, determines an information updating degree of the at least one second user in a preset second time interval and determines a time interval adjustment value of requesting the dynamic information based on the information updating degree; determines a time interval value according to the time interval reference value and the time interval adjustment value of requesting the dynamic information, and requests the dynamic information of the at least one second user according to the time interval value of requesting the dynamic information. Thus, according to embodiments of the present invention, all users are not configured with a same time interval value. According to a previous active degree of the at least one second user and an active degree of the at least one second user in a previous short time period, time interval values for different users are respectively calculated. Thus, according to active degrees of the at least one second users, a time interval value of requesting the dynamic information is accurately controlled. Thus, in the condition that updated dynamic information of the at least one second user is obtained in real time, the number of dynamic message requests is reasonably decreased, and processing load of the servers is decreased.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for obtaining dynamic information of users in a social network, comprising:

obtaining, by a first client of a first user in the social network, a relationship chain of the first user, wherein the relationship chain of the first user comprises at least one second user in the social network;

determining, by the first client, an active degree of the at least one second user in a preset first time period, determining a time interval reference value of requesting dynamic information according to the active degree, determining an information updating degree of the at least one second user in a preset second time interval, determining a time interval adjustment value of requesting the dynamic information based on the information updating degree;

determining, by the first client, a time interval value according to the time interval reference value and the time interval adjustment value of requesting the dynamic information, and requesting the dynamic information of the at least one second user in the social network from a server according to the time interval value of requesting the dynamic information;

wherein the first client determining the active degree of the at least one second user in the preset first time period comprises:

determining whether there is the updated dynamic information for the at least one second user in the preset first time period; when there is the updated dynamic information for the at least one second user in the preset first time period, recording the number of second users respectively updating the dynamic information, and calculating the active degree of the at least one second user in the preset first time period according to the recorded number of the second users respectively updating the dynamic information and a length of the preset first time period;

wherein the active degree M of the at least one second user in the preset first time period is calculated through a way as follows:

$$M=(m \times na)/ti;$$

wherein m comprises a preset reference coefficient of the active degree, ti comprises a length of the preset first time period, na comprises the number of the second users respectively updating the dynamic information in the preset first time period.

2. A method for obtaining dynamic information of users in a social network, comprising:

obtaining, by a first client of a first user in the social network, a relationship chain of the first user, wherein the relationship chain of the first user comprises at least one second user in the social network;

determining, by the first client, an active degree of the at least one second user in a preset first time period, determining a time interval reference value of requesting dynamic information according to the active degree, determining an information updating degree of the at least one second user in a preset second time interval, determining a time interval adjustment value of requesting the dynamic information based on the information updating degree;

determining, by the first client, a time interval value according to the time interval reference value and the time interval adjustment value of requesting the dynamic information, and requesting the dynamic information of the at least one second user in the social network from a server according to the time interval value of requesting the dynamic information;

wherein the time interval reference value A of requesting the dynamic information is determined based on the active degree through a way as follows:

$$A=T-M,$$

wherein T comprises a preset time value, M comprises the active degree of the at least one second users in the preset first time period.

3. A method for obtaining dynamic information of users in a social network, comprising:

obtaining, by a first client of a first user in the social network, a relationship chain of the first user, wherein the relationship chain of the first user comprises at least one second user in the social network;

determining, by the first client, an active degree of the at least one second user in a preset first time period, determining a time interval reference value of requesting dynamic information according to the active degree, determining an information updating degree of the at least one second user in a preset second time interval, determining a time interval adjustment value of requesting the dynamic information based on the information updating degree;

determining, by the first client, a time interval value according to the time interval reference value and the time interval adjustment value of requesting the dynamic information, and requesting the dynamic information of the at least one second user in the social network from a server according to the time interval value of requesting the dynamic information;

wherein the first client determining the information updating degree of the at least one second user in the preset second time interval comprises:

determining whether there is the updated dynamic information for the at least one second user in the preset second time period; when there is the updated dynamic information for the at least one second user in the preset second time period, obtaining the number of pieces of the updated dynamic information for all the at least one second user in the preset time period, calculating the information updating degree in the preset second time period according to the number of the pieces of the updated dynamic information and a length of the preset second time period;

wherein the information updating degree N of the at least one second user in the preset second time period is calculated through a way as follows:

$$N=(n \times ta)/nb,$$

wherein n comprises a preset reference coefficient of the information updating degree, ta comprises the length of the preset second time period, nb comprises the number of the pieces of the dynamic information respectively updated by all the at least one second user in the preset second time period.

4. A method for obtaining dynamic information of users in a social network, comprising:

obtaining, by a first client of a first user in the social network, a relationship chain of the first user, wherein the relationship chain of the first user comprises at least one second user in the social network;

determining, by the first client, an active degree of the at least one second user in a preset first time period, determining a time interval reference value of requesting dynamic information according to the active degree, determining an information updating degree of the at least one second user in a preset second time interval, determining a time interval adjustment value of requesting the dynamic information based on the information updating degree;

determining, by the first client, a time interval value according to the time interval reference value and the time interval adjustment value of requesting the dynamic information, and requesting the dynamic information of the at least one second user in the social network from a server according to the time interval value of requesting the dynamic information;

wherein the time interval adjustment value B of requesting the dynamic information is determined through a way as follows:

$$B=T \times N,$$

wherein T comprises a preset reference coefficient of the time interval adjustment value, N comprises the information updating degree of the at least one second user in the preset second time period.

* * * * *